United States Patent
Deck et al.

(10) Patent No.: US 6,910,813 B2
(45) Date of Patent: Jun. 28, 2005

(54) ALIGNMENT OF A LENS ARRAY AND A FIBER ARRAY

(75) Inventors: Leslie L. Deck, Middletown, CT (US); David Kent, Framingham, MA (US); Phillip H. Malyak, Canton, MA (US)

(73) Assignee: Zygo Corporation, Middlefield, CT (US)

( * ) Notice: Subject to any disclaimer, the term of this patent is extended or adjusted under 35 U.S.C. 154(b) by 472 days.

(21) Appl. No.: 10/098,742

(22) Filed: Mar. 15, 2002

(65) Prior Publication Data

US 2002/0150358 A1 Oct. 17, 2002

Related U.S. Application Data

(60) Provisional application No. 60/276,271, filed on Mar. 15, 2001.

(51) Int. Cl.[7] .............................................. G02B 6/255
(52) U.S. Cl. ....................................... 385/93; 385/147
(58) Field of Search ............................ 385/30, 31, 32, 385/33, 147, 52, 88, 93, 89, 92, 94; 436/172; 250/459.1; 356/138, 153

(56) References Cited

U.S. PATENT DOCUMENTS

| | | | |
|---|---|---|---|
| 4,620,284 A | 10/1986 | Schnell et al. ............... 364/498 |
| 5,907,404 A | 5/1999 | Marron et al. ............... 356/360 |
| 2002/0131699 A1 * | 9/2002 | Raguin et al. ................. 385/33 |
| 2003/0020903 A1 * | 1/2003 | Healy et al. ................. 356/138 |
| 2003/0210389 A1 * | 11/2003 | Matsumoto et al. ........ 356/153 |
| 2004/0121483 A1 * | 6/2004 | Corson et al. ............... 436/172 |
| 2004/0146253 A1 * | 7/2004 | Wang et al. ................... 385/93 |

OTHER PUBLICATIONS

Groot, et al., "Interferometric evaluation of lenslet arrays for 2–D phase–locked laser diode sources," PIE 1333. 347–355 (1990).

Sickinger et al. "Fiber based Mach–Zehnder interferometer for measuring wave aberrations of microlenses," *OPTIK: International Journal for Light and Electron Optics.* 110, 5, 239–243 (1999).

\* cited by examiner

*Primary Examiner*—Akm Enayet Ullah
(74) *Attorney, Agent, or Firm*—Fish & Richardson P.C.

(57) ABSTRACT

An apparatus for aligning a lens with an array package holding an optical fiber includes a stage assembly configured to adjustably position the lens relative to the array package. An interferometer has a measurement port in optical communication with the fiber and an output port configured to provide an output signal indicative of a position of the lens relative to the fiber.

25 Claims, 4 Drawing Sheets

ALIGNMENT OF A LENS ARRAY AND A FIBER ARRAY

RELATED APPLICATIONS

This application claims the benefit of the Mar. 15, 2001 filing date of U.S. Provisional Application No. 60/276,271, entitled "Method and Apparatus for Alignment and Testing of Fiber Collimator", the contents of which are incorporated by reference.

FIELD OF INVENTION

This invention relates to fiber-optic transmission systems, and in particular, to the manufacture of devices for optical coupling across free-space.

BACKGROUND

In a fiber-optic system, it is sometimes necessary for a beam of light to emerge from a source fiber into free space and to later enter a destination fiber. To accomplish this, the beam of light that emerges from the source fiber must be guided across the free space so that as much light as possible from that beam enters the destination fiber. The extent to which light emerging from the source fiber fails to enter the destination fiber is referred to as the "insertion loss."

The guiding of the beam of light across the free space is typically accomplished by lenses and mirrors. Since the source fiber is essentially a point source of light, the waves emerging from it are spherical waves. As they propagate through free space, these spherical waves tend to disperse the energy contained in the beam along a spherical wavefront. To reduce insertion loss arising from such dispersion, a collimating lens is typically placed in front of the source fiber.

The collimating lens transforms the spherical wavefronts that emerge from the source fiber into nearly planar wavefronts that propagate in a selected direction. The extent to which a collimating lens does so depends, to a great extent, on the position and orientation of the collimating lens relative to the fiber. If the collimating lens is not oriented correctly, the beam will point in the wrong direction. If the collimating lens is too far or too close to the source fiber, the beam will not have sufficiently planar wavefronts to remain collimated as it propagates toward the destination fiber.

Even small errors in the position and orientation of a collimating lens lead to unacceptable insertion losses. As a result, it is critical that the collimating lens be positioned correctly relative the source fiber. This is a difficult enough task in the case of a single collimating lens positioned over a single source fiber. It is made even more difficult when an array of collimating lenses is to be correctly positioned over a corresponding array of source fibers.

SUMMARY

An apparatus incorporating the invention aligns a lens and an array package by making interferometric measurements that provide information indicative of the orientation and position of the lens relative to the array package. These measurements are then used to move the lens and the array package relative to each other.

In one embodiment, an apparatus for aligning a lens with an array package holding a fiber includes a stage assembly configured to adjustably position the lens relative to the array package and an interferometer. The interferometer has a measurement port in optical communication with the fiber and an output port configured to provide an output signal indicative of a position of the lens relative to the fiber.

In some embodiments, the stage assembly includes a fixed stage for supporting one of the array package and the lens and a moveable stage for supporting an other of the array package and the lens. The moveable stage can be configured to translate relative to the fixed stage, or in some cases, to rotate relative to the fixed stage, or to both rotate and translate relative to the fixed stage.

Other embodiments provide an image-acquisition system in communication with the output port for receiving the output signal.

The stage can be adjusted manually, by an operator viewing the image provided by the image acquisition system. However, in some embodiments, a processing system is in communication with the image-acquisition system. This processing system is configured to determine, on the basis of the output signal, an adjustment to the stage assembly. A motor in communication with the processing system and the stage assembly is configured to adjust the stage assembly in response to instructions from the processing system.

In other embodiments, the apparatus also includes a light source for illuminating the fiber, a first beam-splitter in optical communication with the laser, and with a reference port of the interferometer, and a second beam-splitter in optical communication with the first beam-splitter. An output of the second beam-splitter provides an optical coupling with the fiber.

Other embodiments include one or more optical elements for improving fringe contrast and reducing unwanted reflections. Such optical elements include any combination of: a polarization control device to adjust a polarization state of light entering the interferometer, one or more quarter-wave plates within the interferometer, and an attenuator. The position and orientation of one or more of the foregoing optical elements can be adjusted in response to measurements provided to a processing system.

The invention also provides a method for aligning a lens with an array package holding at least one fiber. The method includes positioning the lens to intercept light emerging from at least one fiber and passing a measurement beam through that fiber and lens and into a measurement port of an interferometer. A reference beam is then passed into a reference port of the interferometer.

Additional practices of the invention include detecting an interference signal indicative of interference between the measurement beam and the reference beam. The lens can then be re-positioned relative to the fiber on the basis of the interference signal.

In another practice of the invention, a method for aligning a first lens with an array package holding a first fiber includes positioning the first lens to intercept light emerging from the first fiber and passing a first measurement beam through the first fiber and the first lens and into a measurement port of an interferometer. An amplitude signal is then detected. This amplitude signal includes information indicative of a position of the first lens relative to the fiber.

These and other features of the invention will be apparent from the following detailed description and the accompanying figures, in which:

DETAILED DESCRIPTION

Figure 1:
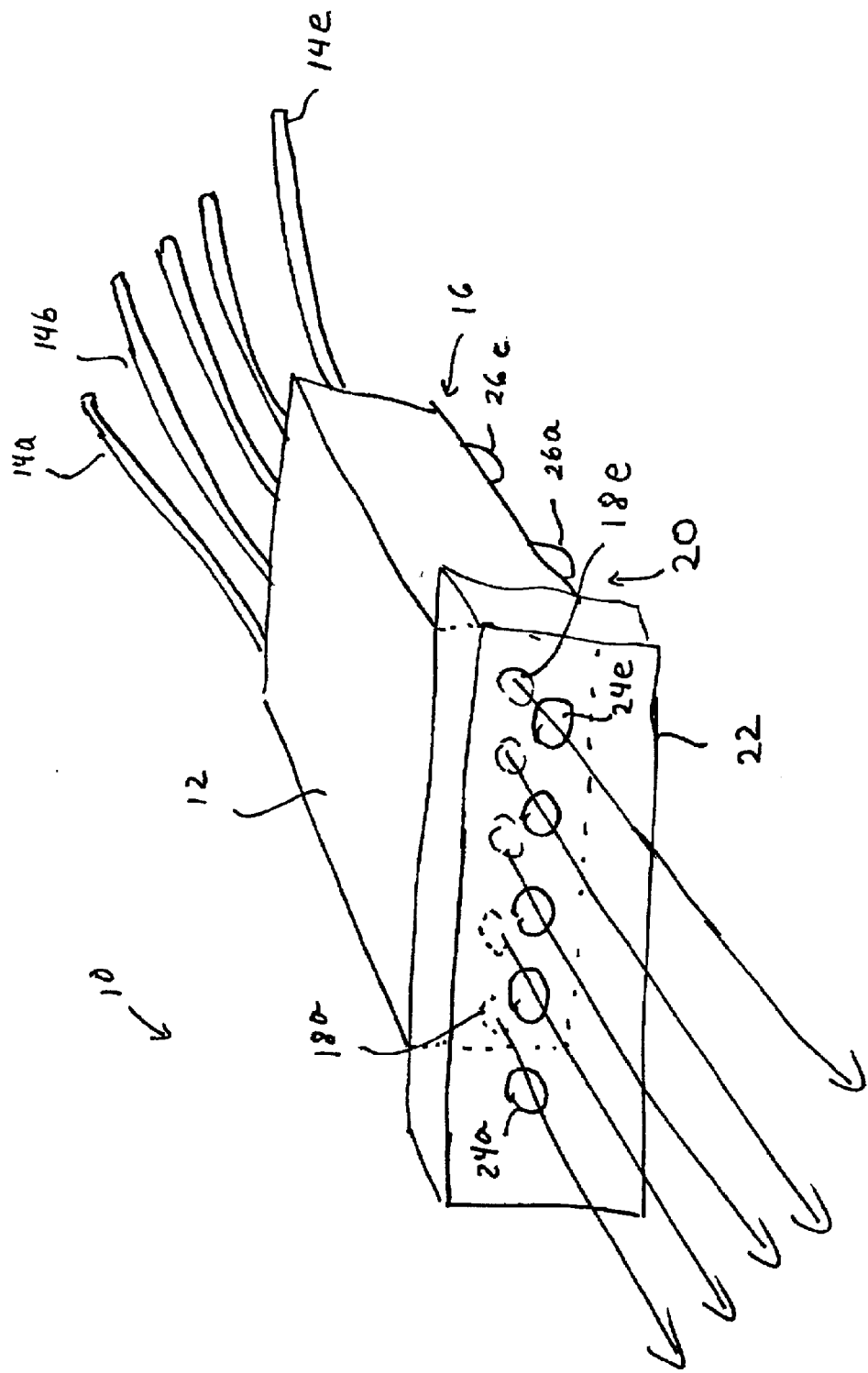
FIG. 1 shows a free-space coupler manufactured by an apparatus incorporating the invention.

FIG. 1 shows a free-space coupler 10 manufactured by an apparatus incorporating the invention. The free-space coupler 10 includes an array package 12 that receives a plurality of fibers 14a–e at its proximal end 16. These fibers 14a–e terminate at exit faces 18a–e flush with a distal end 20 of the array package 12. Adjacent to the distal end 20 of the array package 12 is a collimating-lens array 22 having a corresponding plurality of collimating lenses 24a–e. Each collimating lens 24a–e is positioned to intercept a beam emerging from a corresponding exit face 18a–e.

As described herein, the lens array 22 that is to be aligned with the array package is an array of collimating lenses. However, the invention does not depend on the function carried out by the lenses to be aligned. The lens array 22 can include converging lenses, diverging lenses, or any other lens. In addition, the lens array 22 can include lenses of different types.

The free-space coupler 10 is intended to be mounted on a bench so as to cooperate with other components in an optical system. To cooperate effectively with other components of the optical system, the free-space coupler 10 is precisely aligned relative to those components. A kinematic coupling provided between the bench and the free-space coupler 10 assists in such alignment. One of the kinematic coupling elements is formed on the array package 12. In the illustrated embodiment, the kinematic coupling element on the array package 12 includes three hemispheres 26a–c (two of which are visible in FIG. 1) configured to engage corresponding recesses in a bench.

The collimating-lens array 22 is mounted relative to the array package 12 so that the beam emerging from each exit face 18a–e is in focus and so that all beams emerging from all exit faces 18a–e point in the same direction. In addition, the collimating-lens array 22 is mounted so that all beams point in a direction parallel to a plane defined by the three hemispheres 26a–c. The beams emerging from the exit faces 18a–e are thus aligned both relative to each other and relative to an absolute frame of reference defined by the kinematic coupling element on the array package 12.

Figure 2:
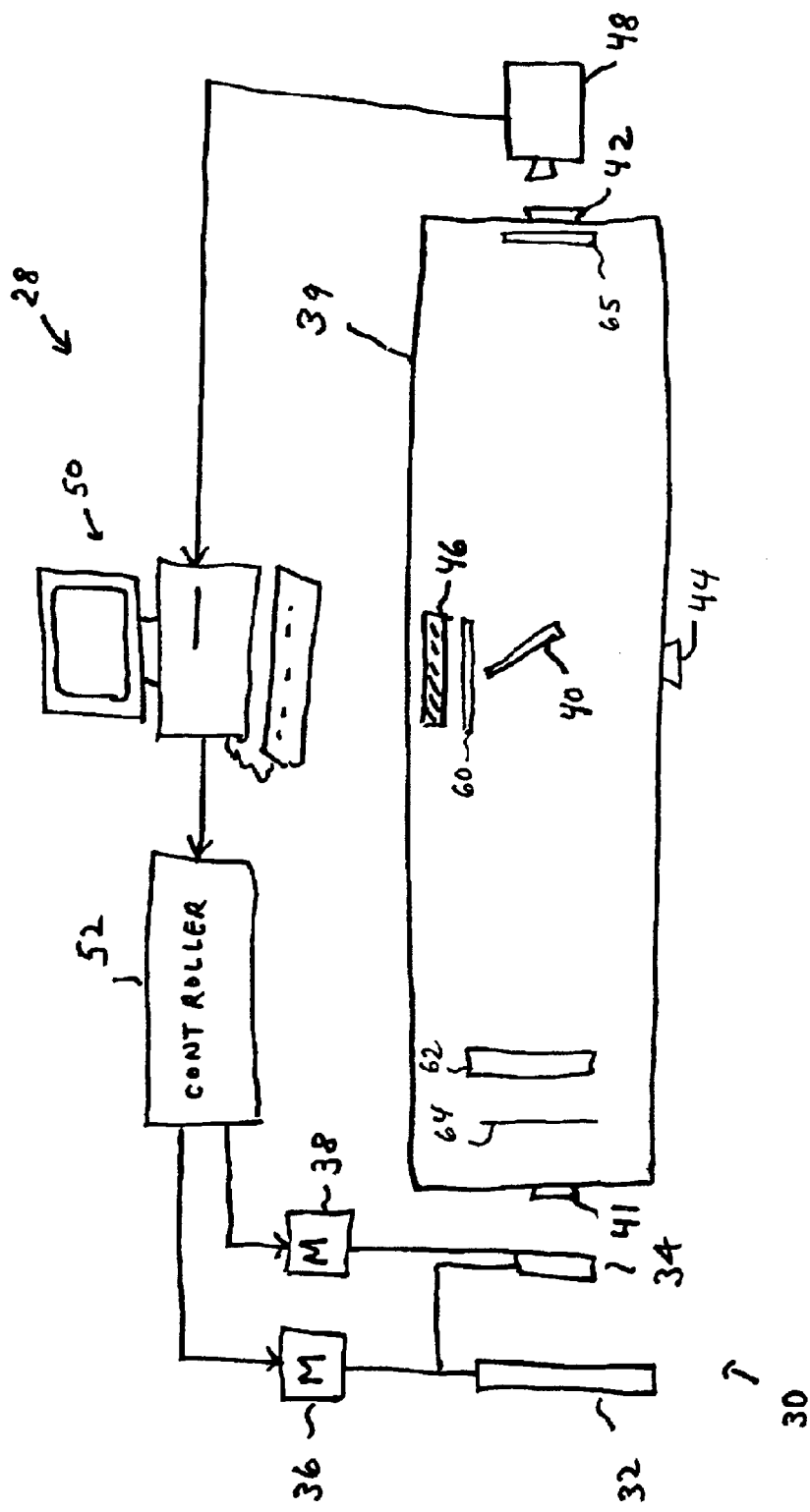
FIG. 2 shows an apparatus for aligning the lens array with the array package shown in FIG. 1.

FIG. 2 shows an apparatus 28 for aligning the collimating-lens array 22. The apparatus 28 includes a stage assembly 30 having a first stage 32 for mounting the array package 12 and a second stage 34 for mounting the collimating-lens array 22. A first motor 36, coupled to both the first and second stages 32, 34 causes the first and second stages 32, 34 to move together as a unit. A second motor 38, coupled to the second stage 34, moves the second stage 34 independently of the first stage 32. In both cases, movement can include translation in any of three perpendicular directions, rotation about any of three perpendicular axes, or any combination of translation and rotation. Moreover, since what is important is relative motion between the first and second stages 32, 34, some embodiments include a second stage 34 that is held stationary while the first stage 32 moves relative to the second stage 34.

The apparatus 28 also includes a Michelson interferometer 39 having a measurement port 41 leading to a measurement optical path that extends from the measurement port 41, through a half-silvered diagonal mirror 40, and out through an output port 42. A line extending between the measurement port 41 and the output port 42 defines a first optical axis of the interferometer 39.

The interferometer 39 also includes a reference port 44 leading to a reference optical path that extends through the half-silvered diagonal mirror 40, to a reference mirror 46, back to the half-silvered diagonal mirror 40, and out to through the output port 42. A line extending between the reference port 44 and the reference mirror 46 defines a second optical axis of the interferometer 39. This second optical axis is perpendicular to the first optical axis.

An image-acquisition system 48 is positioned to receive light emerging from the output port 42. This light is a superposition of a first beam traversing the reference optical path and a second beam traversing the measurement optical path. The first and second beams interfere with each other. The image-acquisition system 48 thus forms an image carrying information indicative of interference between the first and second beams. The image-acquisition system 48 communicates data representative of this image to a processing system 50. On the basis of this data, the processing system 50 provides instructions to a controller 52, which causes the first and second motors 36, 38 to move or rotate the stage assembly 30 or the second stage 34.

Figure 3:
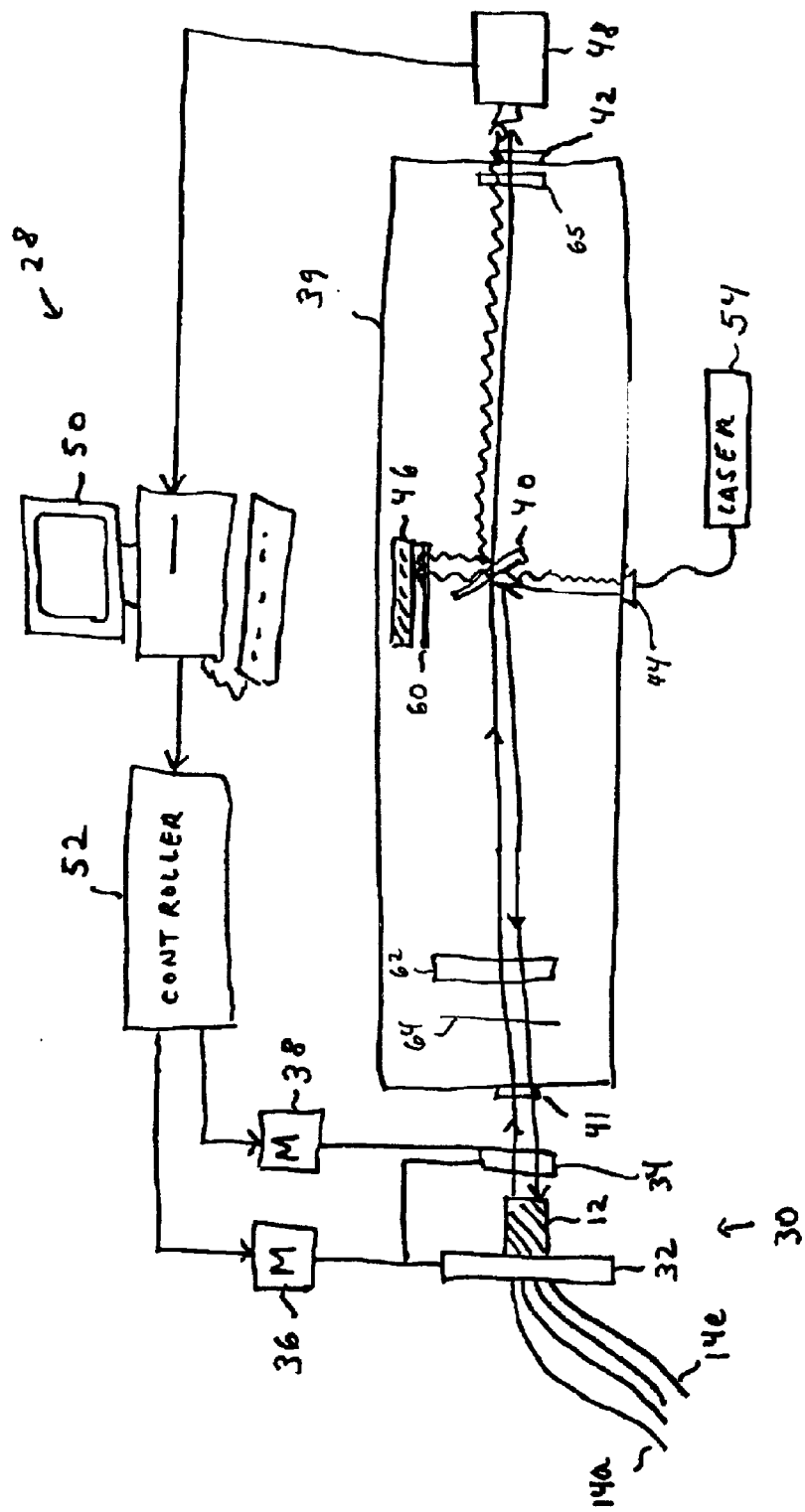
FIG. 3 shows the apparatus of FIG. 2 with an array package mounted on the stage assembly thereof.

The first step in aligning a collimating-lens array 22 is to mount the array package 12 on the first stage 32, as shown in FIG. 3. In this first step, the collimating-lens array 22 is not used. A light source 54 is then coupled to the reference port 44. In one embodiment, the light source 54 is a temporally coherent light source, such as a laser. One suitable laser is a near-IR laser having an output wavelength of 1550 nanometers. In such a case, the image-acquisition system includes an infra-red camera tuned to detect light at the output wavelength of the light source 54. However, the light source 54 can also be a temporally incoherent light source, provided that the path length difference between the reference optical path and the measurement optical path is less than the coherence length of the light.

A first portion of the light entering the reference port 44, shown by the straight lines in FIG. 3, reflects off the diagonal mirror 40 toward the array package 12. This first portion exits the interferometer 39 through the measurement port 41, reflects off the array package 12, and re-enters the interferometer 39 through the measurement port 41. It proceeds through the diagonal mirror 40, exits the interferometer 39 through the output port 42, and enters the image-acquisition system 48.

A second portion of the light entering the reference port 44, shown by the wavy lines in FIG. 3, travels through the diagonal mirror 40 to the reference mirror 46. The second portion then reflects off the diagonal mirror 40 toward the output port 42 and enters the image-acquisition system 48.

The image received by the image-acquisition system 48 is thus the superposition of the first and second portions of the light entering the reference port 44. This can include interference fringes that are indicative of the position and orientation of the surface on the array package 12 from which the first portion reflects.

The image-acquisition system 48 provides data representative of the interference fringes to the processing system 50. The processing system 50 determines, on the basis of this data, the extent to which the stage assembly 30 must be translated and/or rotated to bring the array package 12 into a desired position and to ensure that the first optical axis is parallel to the plane defined by the kinematic coupling elements on the array package 12. Techniques for determining required translations and rotations on the basis of observed interference fringes are well-known in the art of phase interferometry. The processing system 50 instructs the controller 52 to translate and/or rotate the stage assembly 30. The controller then causes the first motor 36 to translate and/or rotate the stage assembly 30 as required.

Figure 4:
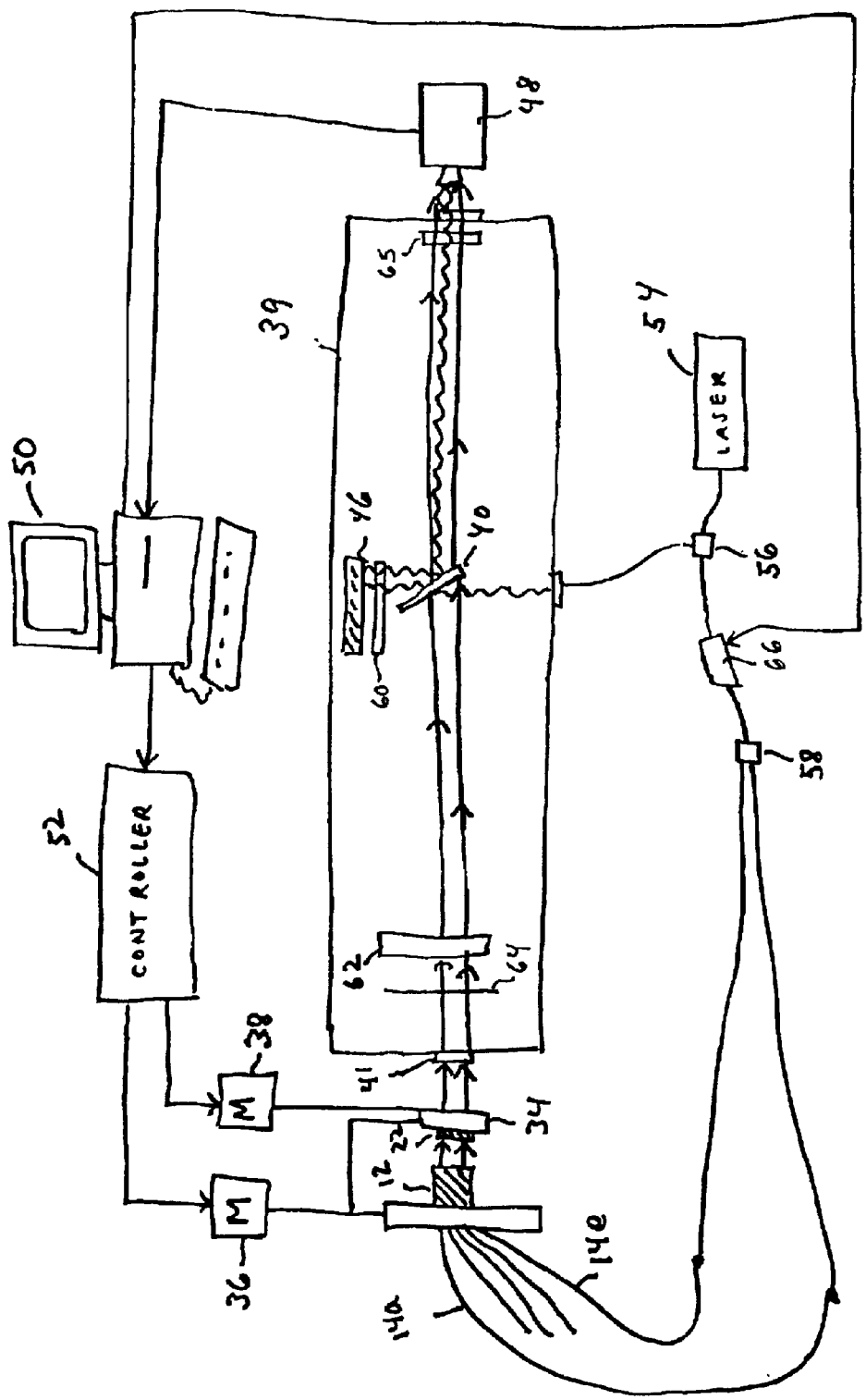
FIG. 4 shows the apparatus of FIG. 2 with an array package and a lens array mounted on the stage assembly thereof.

With the array package 12 now in the correct position and having the correct orientation relative to the first optical axis, the second step in the alignment process is to mount the collimating-lens array 22 on the second stage 34, as shown in FIG. 4. In this step, the output of the light source 54 is provided to a first beam-splitter 56. The first beam-splitter 56 sends a first portion of the beam into the reference port 44 of the interferometer 39 and sends a second portion of the beam into a second beam-splitter 58. The first portion of the laser's output traverses the reference path in the manner already described in connection with FIG. 3. In one embodiment, the first beam-splitter 56 is a 10:1 beam-splitter that sends most of the laser's output to the second beam-splitter 58.

The second beam-splitter 58 divides the energy in the second portion of the beam into two equal parts. These equal parts feed first and second fibers 14a, 14e that lead into the array package 12. Preferably, the first and second fibers 14a, 14e are selected such that their respective exit faces 18a, 18e on the array package 12 are as far apart as possible (see FIG. 1). This choice enables the alignment process to be more sensitive to small changes in orientation of the collimating-lens array 22.

Because of the alignment carried out in the first step, the first and second portions of the second beam exit the respective exit faces 18a, 18e of the first and second fibers 14a, 14e in a direction parallel to the first optical axis of the interferometer 39. After leaving the respective exit faces 18a, 18e, the first and second portions of the second beam pass through corresponding first and second collimating lenses 24a, 24e in the collimating-lens array 22. Depending on the position and orientation of the collimating-lens array 22, the first and second portions are deflected from the optical axis and/or de-focused.

After passing through the first and second collimating lenses 24a, 24e, the first and second portions enter the interferometer 39 through the measurement port 41, pass through the diagonal mirror 40, and exit the interferometer 39 through the output port 42. The image-acquisition system 48 thus forms a first image on the basis of the superposition of the first beam and the first portion of the second beam and a second image on the basis of the superposition of the first beam and the second portion of the second beam.

The extent to which the first and second portions are either deflected from the optical axis or de-focused is manifested in interference fringes present in the first and second images.

For example, the presence of lateral fringes on the first and second images indicates the extent to which the first and second collimating lenses 24a, 24e have deflected the first and second portions of the second beam. On the basis of these lateral fringes, the processing system 50 determines how much and in what direction to move the collimating-lens array 22 to reduce or eliminate this deflection. This movement can include translation of the lens array in a direction perpendicular to the optical axis or rotation of the lens array in the plane perpendicular to the optical axis.

Similarly, the presence of power fringes, or circular fringes, in the first and second images indicates the extent to which the first and second collimating lenses 24a, 24e have de-focused the first and second portions of the second beam. On the basis of these power fringes, the processing system 50 determines how much and in what direction to move the collimating-lens array 22 relative to the array package 12 to bring the first and second portions of the second beam into focus. Such movement can include translation of the lens array along the optical axis or rotation of the lens array outside the plane perpendicular to the optical axis.

The image-acquisition element 48 provides data representative of the first and second images to the processing system 50. The processing system 50 then determines, on the basis of this data, the extent to which the collimating-lens array 22 is to be translated or rotated relative to the array package 12 so as to bring the first and second portions of the second beam into alignment with the first optical axis and into focus. The processing system 50 then provides instructions for translating and rotating the collimating-lens array 22 to the controller 52, which then causes the second motor 38 to translate or rotate the second stage 34.

When the processing system 50 determines that the collimating-lens array 22 is properly positioned and aligned relative to the array package 12, the collimating-lens array 22 is affixed to the array package 12. In one embodiment, this includes applying a UV-curable adhesive between the array package 12 and the collimating-lens array 22 and curing the adhesive once the processing system 50 indicates that the collimating-lens array 22 is properly positioned and aligned relative to the array package 12.

Other embodiments incorporate various optical elements to maximize fringe contrast and to eliminate or reduce stray reflections that would otherwise produce undesired interference fringes. These optical elements include one or more of the following: first and second quarter-wave plates 60, 62 inserted along the reference optical path and the measurement optical path, an attenuator 64 inserted along the measurement optical path, and an analyzer 65 at the output port 42.

In one embodiment, the attenuator 64 is a pellicle attenuator. A pellicle attenuator is desirable because it is so thin that beams incident from a direction other than the normal direction are not appreciably refracted. However, other types of attenuators can be used. Such attenuators include reflective attenuators, for example half-silvered mirrors and coated beamsplitters, and absorptive attenuators, such as colored glass filters etc.

The analyzer 65 at the output port 60 ensures that only light that has traveled through a quarter-wave plate 60, 62 ultimately passes through the output port 60. When linearly polarized light passes through a quarter-wave plate 60, 62, it becomes circularly polarized. After reflecting from a surface, the light remains circularly polarized, but in the opposite direction. When this circularly polarized light passes through the quarter-wave plate 60, 62 a second time, this time from the other direction, it becomes linearly polarized again, but along a direction orthogonal to its original direction of polarization. The analyzer 65 is aligned to pass only light having this orthogonal polarization. As a result, light that has not passed through the quarter-wave plate 60, 62 cannot pass through the analyzer 65.

In some embodiments, a single-mode fiber provides a portion of an optical coupling between the light source 54 and the fibers 14a, 14e. Since the interferometer 39 operates best with linearly polarized light, and since the single-mode fiber does not maintain polarization, a polarization controller 66 is inserted in the optical path between the first and second beam-splitters 56, 58. The polarization controller 66 transforms the polarization state of an input beam to generate an output beam having a desired polarization state. In some embodiments, the polarization controller 66 does so in response to instructions from the processing system 50. The processing system 50 controls the output of the polarization controller 66 on the basis of a signal available at the output port 42 of the interferometer 39.

The signal available at the output port 42 can contain phase information, amplitude information, or a combination of both. For example, if light is passed through both the reference port 44 and a measurement port 41, then the signal at the output port 42 contains phase information in the form of interference fringes. Alternatively, if light is passed through only the measurement port 41, then the signal at the output port 42 contains only amplitude information.

The processing system 50 can be configured to detect either phase or amplitude in the signal and to use that information to control the polarization state of light emerging from the interferometer 39. The processing system 50 does so by adjusting the polarization controller 66, by rotating a quarter-wave plate 60, 62 within the interferometer 39, or by any combination thereof.

The processing system 50 can control either the polarization controller 66 or the orientation of the quarter-wave plate 60 on the basis of the signal present at the output port 42. For example, the processing system 50 can control the position of the quarter-wave plate on the basis of interference contrast information available at the output port 42 of the interferometer.

The alignment method and apparatus can be used to align a collimating-lens array 22 in which the collimating lenses 24a–e are disposed as a one-dimensional array, as shown in FIG. 1, as a two-dimensional array, or in an any arbitrary one or two-dimensional configuration. The alignment method and apparatus place no limit on the number of collimating lenses. In particular, the method and apparatus disclosed herein can be used to align a single collimating lens over a single exit face.

Having described the invention, and a preferred embodiment thereof, what we claim as new, and secured by Letters Patent is:

1. An apparatus for aligning a lens with an array package holding an optical fiber, said apparatus comprising:
    a stage assembly configured to adjustably position said lens relative to said array package; and
    an interferometer having a measurement port in optical communication with said fiber, said interferometer configured to provide an output signal indicative of a position of said lens relative to said fiber.
2. The apparatus of claim 1, wherein said stage assembly comprises:
    a fixed stage for supporting one of said array package and said lens,
    and a moveable stage for supporting an other of said array package and said lens.
3. The apparatus of claim 2, wherein said moveable stage is configured to translate relative to said fixed stage.
4. The apparatus of claim 2, wherein said moveable stage is configured to rotate relative to said fixed stage.
5. The apparatus of claim 1, further comprising an image-acquisition system in communication with said interferometer for receiving said output signal.
6. An apparatus for aligning a lens with an array package holding an optical fiber, said apparatus comprising:
    a stage assembly configured to adjustably position said lens relative to said array package;
    an interferometer having a measurement port in optical communication with said fiber, said interferometer configured to provide an output signal indicative of a position of said lens relative to said fiber;
    an image-acquisition system in communication with said interferometer for receiving said output signal; and
    a processing system in communication with said image-acquisition system, said processing system being configured to determine, on the basis of said output signal, an adjustment to said stage assembly.
7. The apparatus of claim 6, further comprising a motor in communication with said processing system and said stage assembly, said motor being configured to adjust said stage assembly in response to instructions from said processing system.
8. The apparatus of claim 1, wherein said interferometer comprises an attenuator disposed on a measurement path extending between a beam splitter and said measurement port.
9. An apparatus for aligning a lens with an array package holding an optical fiber, said apparatus comprising:
    a stage assembly configured to adjustably position said lens relative to said array package; and
    an interferometer having a measurement port in optical communication with said fiber, said interferometer configured to provide an output signal indicative of a position of said lens relative to said fiber;
    wherein said interferometer comprises a quarter-wave plate disposed on a path selected from the group consisting of a measurement path extending between a beam splitter and said measurement port and a reference path extending between said beam splitter and a reference port of said interferometer.
10. The apparatus of claim 1, further comprising a light source for illuminating said fiber.
11. The apparatus of claim 10, further comprising a first beam-splitter in optical communication with said light source, and with a reference port of said interferometer.
12. An apparatus for aligning a lens with an array package holding an optical fiber, said apparatus comprising:
    a stage assembly configured to adjustably position said lens relative to said array package;
    an interferometer having a measurement port in optical communication with said fiber, said interferometer configured to provide an output signal indicative of a position of said lens relative to said fiber;
    a light source for illuminating said fiber;
    a first beam-splitter in optical communication with said light source, and with a reference port of said interferometer; and
    a second beam-splitter in optical communication with said first beam-splitter, said second beam-splitter having an output for providing an optical coupling with said fiber.
13. The apparatus of claim 12, further comprising a polarization control device in optical communication with said first beam-splitter and said second beam-splitter.
14. The apparatus of claim 9, further comprising a processing system configured to orient said quarter-wave plate in response to said output signal.
15. The apparatus of claim 13, further comprising a processing system configured to control said polarization control device in response to said output signal.
16. A method for aligning a first lens with an array package holding a first fiber, said method comprising:
    positioning said first lens to intercept light emerging from said first fiber;
    passing a first measurement beam through said first fiber and said first lens and into a measurement port of an interferometer; and passing a reference beam into a reference port of said interferometer.

17. The method of claim 16, further comprising detecting a first interference signal indicative of interference between said first measurement beam and said reference beam.

18. The method of claim 17, further comprising re-positioning said first lens relative to said first fiber on the basis of said first interference signal.

19. The method of claim 16, further comprising aligning said array package relative to an optical axis of said interferometer.

20. A method for aligning a first lens with an array package holding a first fiber, said method comprising:
- positioning said first lens to intercept light emerging from said first fiber;
- passing a first measurement beam through said first fiber and said first lens and into a measurement port of an interferometer;
- passing a reference beam into a reference port of said interferometer;
- detecting a first interference signal indicative of interference between said first measurement beam and said reference beam;
- re-positioning said first lens relative to said first fiber on the basis of said first interference signal;
- passing a second measurement beam through a second fiber held by said array package;
- positioning a second lens to intercept said second measurement beam; and
- detecting a second interference signal indicative of interference between said second measurement beam and said reference beam.

21. The method of claim 20, further comprising positioning said first lens and said second lens relative to said array package in response to said first interference signal and said second interference signal.

22. The method of claim 21 further comprising providing said first and second interference signals to a processing system configured to determine an extent to which said first and second lens are to be moved relative to said array package to align said array package and said first and second lenses.

23. The method of claim 16, further comprising causing said first interference signal to have a selected polarization state.

24. A method for aligning a first lens with an array package holding a first fiber, said method comprising:
- positioning said first lens to intercept light emerging from said first fiber;
- passing a first measurement beam through said first fiber and said first lens and into a measurement port of an interferometer; and
- detecting an amplitude signal indicative of a position of said first lens relative to said fiber.

25. The method of claim 24, further comprising re-positioning said first lens relative to said first fiber on the basis of said amplitude signal.

* * * * *